(12) United States Patent
Gilstrap

(10) Patent No.: US 7,540,073 B1
(45) Date of Patent: Jun. 2, 2009

(54) APPARATUS FOR CLIPPING FILTER AND COALESCER ELEMENTS ON A FRAME

(75) Inventor: Jeffrey K. Gilstrap, Collinsville, OK (US)

(73) Assignee: Braden Manufacturing, L.L.C., Tulsa, OK (US)

( * ) Notice: Subject to any disclaimer, the term of this patent is extended or adjusted under 35 U.S.C. 154(b) by 337 days.

(21) Appl. No.: 11/475,610

(22) Filed: Jun. 27, 2006

(51) Int. Cl.
*A44B 21/00* (2006.01)
*E05C 5/02* (2006.01)

(52) U.S. Cl. ...................................... 24/581.11; 292/60

(58) Field of Classification Search .............. 24/581.11; 269/43, 74; 411/552, 341, 342, 343; 180/69.21, 180/69.32
See application file for complete search history.

(56) References Cited

U.S. PATENT DOCUMENTS

| | | | |
|---|---|---|---|
| 1,609,164 A * | 11/1926 | Gilmore | ...................... 292/129 |
| 1,895,826 A * | 1/1933 | Trudeau | ...................... 411/552 |
| 3,280,540 A | 10/1966 | Soltis | |
| 3,360,910 A | 1/1968 | Soltis | |
| 3,380,219 A | 4/1968 | Madl, Jr. | |
| 3,740,934 A | 6/1973 | Shuler | |
| 3,750,374 A | 8/1973 | Neumann | |
| 3,999,969 A | 12/1976 | Shuler | |
| 4,243,486 A | 1/1981 | Neumann et al. | |
| 4,601,737 A | 7/1986 | Gerbig | |
| 5,246,579 A | 9/1993 | Probstmeyer | |
| 5,702,218 A * | 12/1997 | Onofrio | ...................... 411/552 |
| 6,338,649 B1 * | 1/2002 | Smith | .......................... 411/552 |
| 6,932,392 B1 * | 8/2005 | Geislhardt | .................... 292/61 |

OTHER PUBLICATIONS

"Gas Turbines Inlet Air Systems" brochure, published by Braden Manufacturing, LLC, 2002, United States.

* cited by examiner

*Primary Examiner*—Robert J Sandy
(74) *Attorney, Agent, or Firm*—Fellers, Snider, Blankenship, Bailey & Tippens

(57) ABSTRACT

An apparatus for releasably clipping to a frame an element for removing particulates, impurities, and/or moisture from an air stream, the apparatus preferably comprising: a self-aligning attachment post; a clip which is longitudinally movable on the post; and a locking member which can be pushed inwardly on the post and which interacts with one or more locking tabs in a manner effective for compressing a biasing member and locking the biasing member in a compressed position for holding the clip in engagement with the element. The apparatus preferably also comprises a handle clip on the outer portion of the attachment post which can be pulled and rotated for installing or removing a second element and can be rotated to a second position and released such that the handle clip will automatically hold the second element on the frame.

11 Claims, 6 Drawing Sheets

APPARATUS FOR CLIPPING FILTER AND COALESCER ELEMENTS ON A FRAME

FIELD OF THE INVENTION

The present invention relates to apparatuses for clipping, to a frame, elements for removing particulates, impurities, moisture, or a combination thereof from an air stream.

BACKGROUND OF THE INVENTION

Filters, coalescers, and other types of elements are commonly employed for removing particulates, impurities, and/or moisture from the inlet air or recirculating air streams used in numerous processes and systems. Such applications can involve the use of single stage elements or the use of multiple element stages wherein two or more elements of the same or different type are placed in series.

A need presently exists for a more effective and much faster device for installing single stage elements or multiple element stages in, and removing the elements from, a holding frame. A need particularly exists for a more effective and much faster device for installing numerous single stage elements or multiple element stages in, and removing the elements from, large frame grids of the type employed in the inlet air filter houses of large gas turbine engines. Such engines are used in the industry for, e.g., electrical power generation or gas compression. The device for installing the elements would preferably not require the use of special tools and, most preferably, would be easily operated by hand.

Gas turbine engines used in the power generation market are typically combustion ignition systems which consume large quantities of air. An inlet air filter house will commonly be located upstream of the turbine to remove dust, moisture, and/or other contaminants from the inlet air stream and prevent fouling and corrosion. Other benefits of the filtration system include optimum power output, reduced heat rate, and extended engine life. The filter house typically contains numerous rectangular filter and/or coalescer elements installed in a grid pattern in a large T-grid frame.

A typical "static barrier" filtration system used in a turbine engine filter house will be a two-stage system comprising (a) numerous final filter elements installed side-by-side in the T-grid frame slots and (b) a corresponding number of less expensive and more expendable pre-filter elements which are installed on the upstream side of the frame over the final filter elements. The pre-filter elements typically collect the majority of the airborne particulate mass contained in the air stream. Alternatively, or in addition, the pre-filter elements can be coalescer or combination coalescer and filter elements which remove moisture and/or particulates. The final filter elements will typically be high efficiency barrier elements which capture smaller particulates which contribute to compressor fouling.

In order to preserve the operating efficiency and effectiveness of the system and to prevent failure, the elements installed in the filter house must frequently be replaced. Replacement of the final filter elements is necessary when the resistance to air flow (i.e., pressure drop) across the elements becomes unacceptably high. If the final elements are not replaced as the pressure drop increases, premature failure or bursting of the final element media can occur. The pre-filter and/or coalescer elements, on the other hand, must typically be replaced three to four more times more frequently than the final elements in order to protect and preserve the more expensive final elements.

Consequently, the development of a device which would allow the pre and final elements to be installed and replaced much more quickly and without the use of special tools, preferably by hand, would greatly facilitate and encourage timely element replacement, increase filtration and engine efficiency, reduce system downtime, reduce labor and other replacement costs, and prolong the useful life of the more costly final filter elements.

SUMMARY OF THE INVENTION

The present invention satisfies the needs and alleviates the problems discussed above. In one aspect, there is provided an apparatus for releasably clipping to a frame at least one element for removing particulates, impurities, moisture, or a combination thereof from an air stream. The apparatus comprises: an attachment post which will extend outwardly from the frame, the attachment post having at least one locking tab thereon; a clip positionable on the attachment post for clipping the element to the frame; a locking member positionable on the attachment post; and a biasing member positionable on the attachment post between the locking member and the clip. The locking member can be moved longitudinally on the attachment post and will interact with the locking tab in a manner effective for compressing the biasing member and locking the biasing member in a compressed position for holding the clip in engagement with the element.

In another aspect, there is provided an apparatus for releasably clipping to a frame member at least one element for removing particulates, impurities, moisture, or a combination thereof from an air stream, wherein the frame member has an outwardly projecting ridge. The apparatus comprises: an attachment post which will extend outwardly from the frame member; a clip positionable on the attachment post for clipping the element to the frame member; and a base on a proximal end of the attachment post, the base being positionable on the outwardly projecting ridge. The base is configured in a manner effective for automatically aligning the attachment post in position for clipping the element to the frame member when the base is placed on the outwardly projecting ridge.

In yet another aspect, there is provided an apparatus for releasably securing on a frame at least one element for removing particulates, impurities, moisture, or a combination thereof from an air stream. The apparatus comprises: an attachment post; a handle clip positionable on the attachment post for longitudinal and rotational movement; and a biasing member positionable on the attachment post. The handle clip can be pulled outwardly and rotated to a first position for installing the element on the frame and the handle clip can be rotated to a second position and released such that the biasing member will urge the handle clip against the element for holding the element on the frame. Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
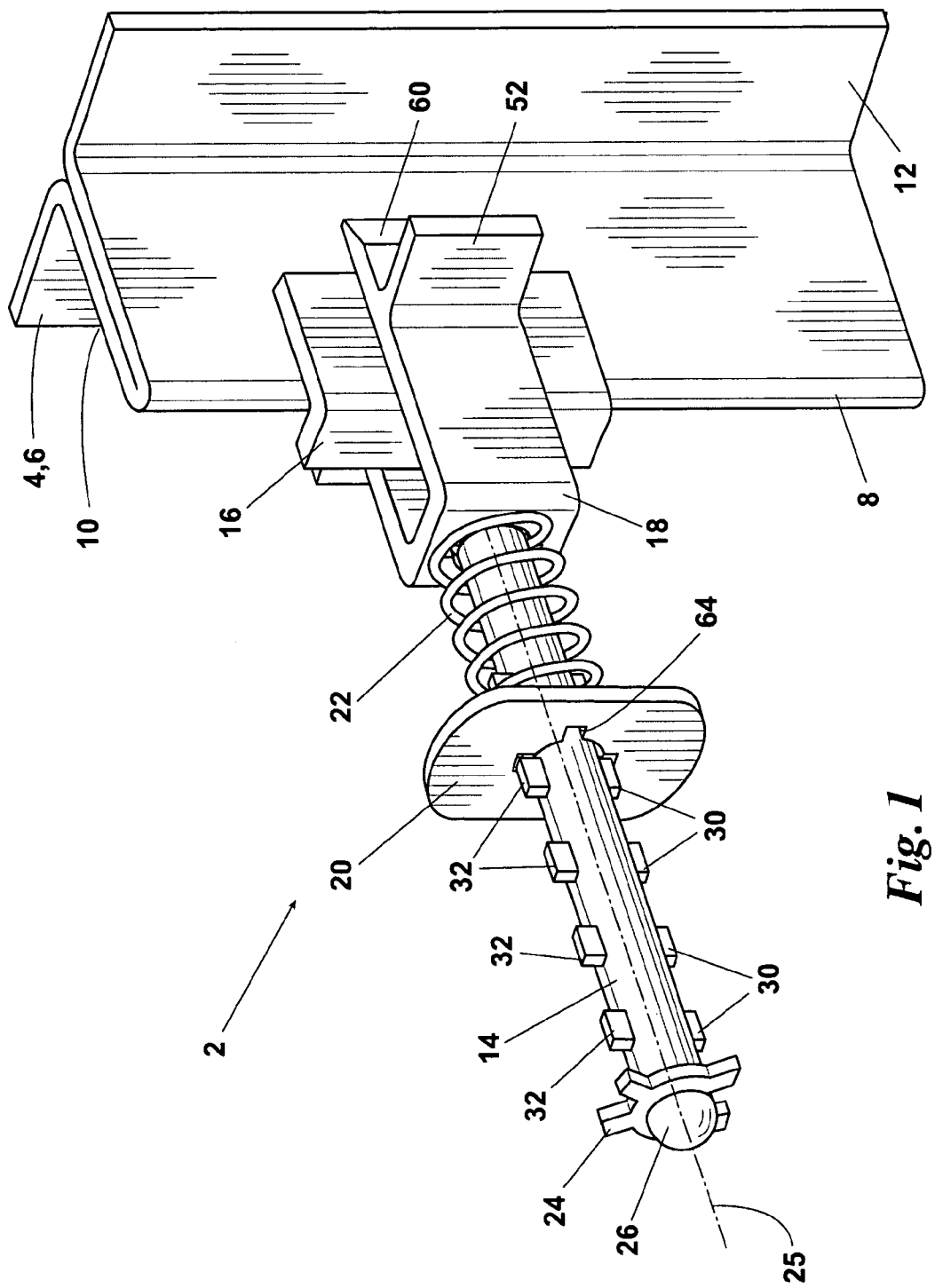
FIG. 1 is a perspective view of an embodiment 2 of the inventive clipping apparatus.
Figure 2:
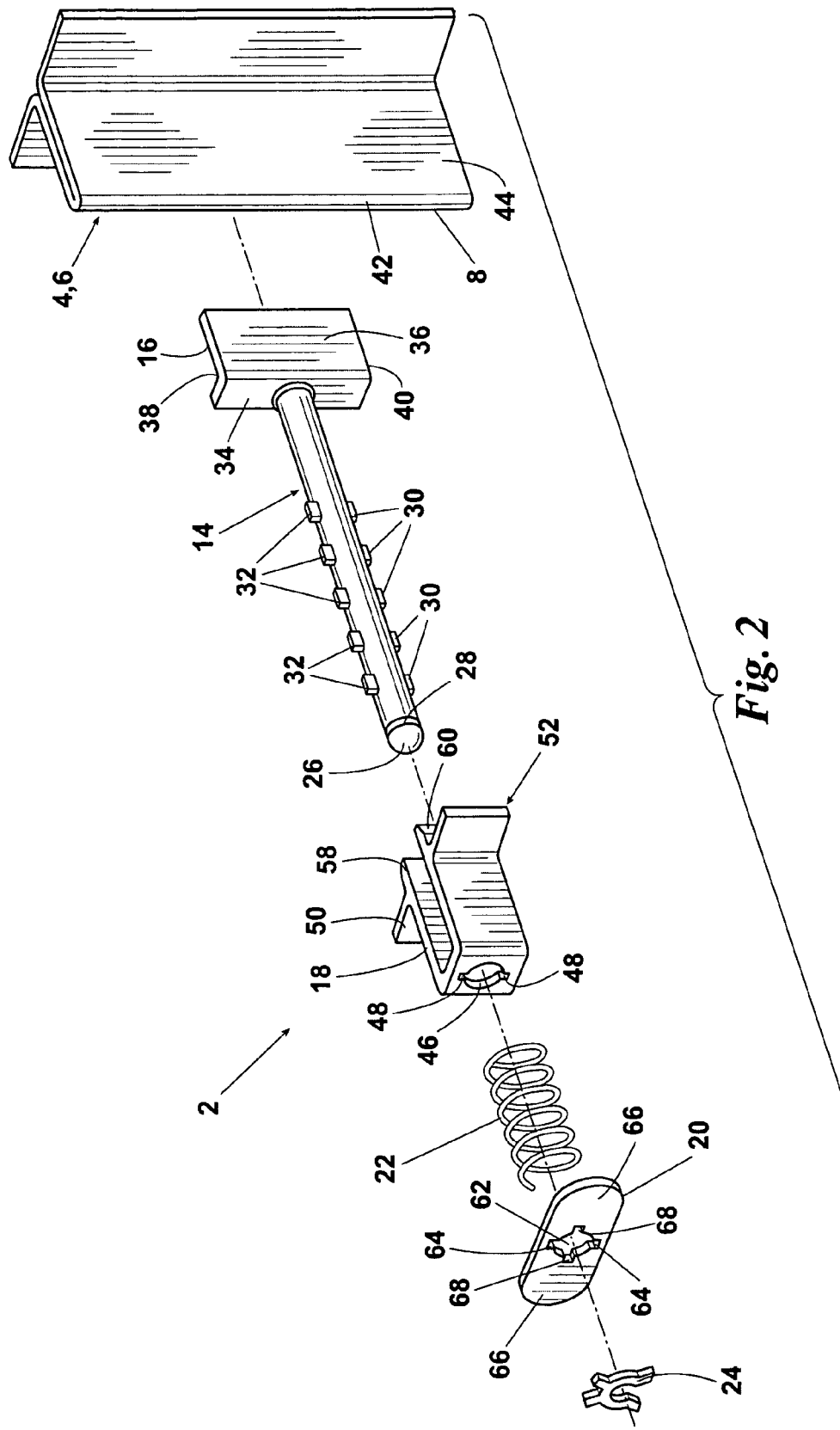
FIG. 2 is an exploded perspective view of the inventive clipping apparatus 2.
Figure 3:
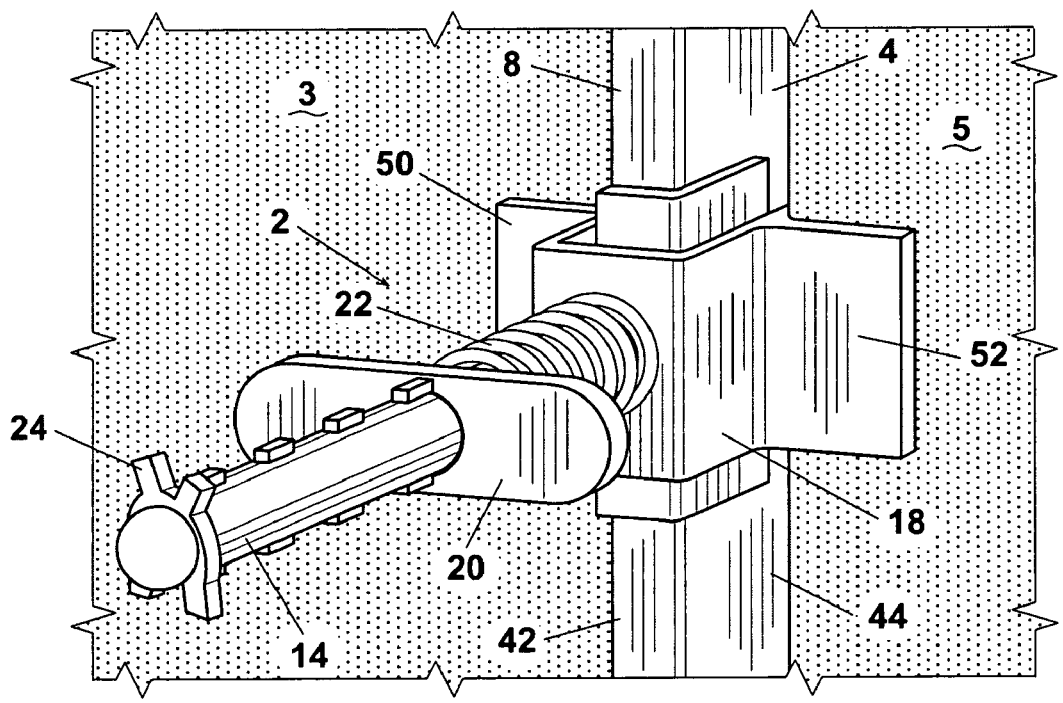
FIG. 3 is a perspective view showing the inventive clipping apparatus 2 being used for clipping side-by-side filter elements 3 and 5 on a frame member 4.

An embodiment 2 of the inventive clipping apparatus is shown in FIGS. 1-3. In FIGS. 1 and 3, the inventive clipping apparatus 2 is installed on a frame member (e.g., a vertical or horizontal cross piece) 4 of a grid frame 6. The frame member 4 includes an outwardly projecting ridge 8 and shoulders 10 and 12 extending laterally from the base of the projecting ridge 8.

The inventive clipping apparatus 2 comprises: an attachment post 14 which extends outwardly from the frame member 4; a base 16 on the proximal end of the attachment post 14; a clip 18 which is positionable on the attachment post 14 such that the clip 18 will preferably straddle the projecting ridge 8 of the frame member 4; a locking member 20 positionable on the attachment post 14; a coil spring or other biasing member 22 positionable on the attachment post 14 between the locking member 20 and the clip 18; and a retainer 24 securable on the outer end of the attachment post 14 for preventing the clip 18, the biasing member 22, and the locking member 20 from falling off the attachment post 14.

The attachment post 14 is preferably an elongate cylindrical member having a longitudinal axis 25. The attachment post 14 comprises: a rounded outer end 26 which reduces puncture potential; a groove 28 formed around the post 14 near the outer end 26 thereof for receiving the retainer 14; and at least one laterally projecting locking tab 30 provided on the post 14 for engagement with the locking member 20. The attachment post 14 preferably also includes a corresponding number of laterally projecting tabs 32 positioned opposite the locking tab(s) 30. The attachment post 14 will most preferably comprise a plurality of opposing locking tabs 30 and 32 to accommodate the attachment of filter elements having different thicknesses.

The base 16 of the attachment post 14 is desirably configured such that, when placed on the outwardly projecting ridge 8 of the frame member 4, the base 16 will automatically align the attachment post 14 in its correct outwardly projecting position as shown in FIGS. 1 and 3 for clipping adjacent filter elements 3 and 5 on the frame member 4. The base 16 is preferably an L-shaped structure comprising: a lateral first portion 34 which is directly attached to and extends laterally from the proximal end of the attachment post 14; an angled portion 36 which extends from one side edge of the lateral first portion 34; and laterals ends 38 and 40 which are located on opposite sides of and are spaced apart from the longitudinal axis 25 of the attachment post 14. The lateral first portion 34 of the base 16 rests on the outer edge 42 of the projecting frame ridge 8 and the angled portion 36 rests on one side 44 of the frame ridge 8. The angle of the angled portion 36 with respect to the lateral first portion 34 will preferably be such as to match the projecting angle of the side 44 of the frame ridge 8.

The self-aligning base 16 of the attachment post 14 can be conveniently installed on the projecting frame ridge 8 by the steps of: placing the lateral first portion 34 and the angled portion 36, respectively, of the base 16 on the outer edge 42 and side 44 of the ridge 8; temporarily clamping the base 16 in this position on the projecting frame ridge 8; and attaching the base 16 to the projecting frame ridge 8 by welding, bonding, or any other suitable method. The base 16 is preferably attached to the projecting frame ridge 8 by welding at or near the lateral ends 38 and 40 of the base 16. Spacing the welds from the centerline 25 of the attachment post 14 in this manner provides a strong attachment which will resist moment forces applied to the attachment post 14.

The clip 18 of the inventive clipping apparatus 2 is preferably a U-shaped structure which can be moved longitudinally on the attachment post 14 and will straddle both the projecting ridge 8 of the frame member 4 and the base 16 of the attachment post 14. The clip 18 preferably comprises: an aperture 46 in the forward end of the clip 18 through which the attachment post 14 is received; one or more slots 48 which extend from the forward end aperture 46 and allow the clip 18 to be moved longitudinally on the attachment post 14 over the lateral locking tab(s) 30 and/or 32; lateral shoulders 50 and 52 extending from each side of the clip 18 for engaging and clipping the edges of the adjacent filter and/or coalescer elements 3 and 5 to the lateral shoulders 10 and 12 of the frame member 4; and longitudinal legs 58 and 60 which extend longitudinally beyond the lateral shoulders 50 and 52. The longitudinal legs 58 and 60 operate as spacers to position the edges of the elements 3 and 5 laterally away from the projecting frame ridge 8 so that the elements 3 and 5 are properly positioned and centered on the frame 6.

The locking member 20 of the inventive clipping apparatus 2 will preferably be a compression washer or other structure or device which can be conveniently and easily operated by hand. The locking member 20 preferably comprises: a central aperture 62 which allows the locking member 20 to be moved longitudinally and rotated on the attachment post 14; one or more slots 64 which extend from the central aperture 62 and allow the locking member 20 to be moved longitudinally on the attachment post 14 over the lateral locking tab(s) 30 and/or 32; laterally extending surfaces and/or ends 66 which the user can conveniently push inwardly using his or her thumbs or fingers; and one or more locking notches 68 provided in the forward side of the locking member 20 for engaging the lateral tab(s) 30 and/or 32 of the attachment post 14 to lock the locking member 20, the biasing member 22, and the clip 18 in clipping position. The locking notches 68 are preferably oriented 90° from slots 64.

When operating the inventive clipping apparatus 2 for clipping the elements 3 and 5 to the lateral shoulders 10 and 12 of the frame member 4, the locking member 20 is rotated to a compressing position wherein the locking tab(s) 30 and/or 32 of the attachment post 14 will pass through the slot(s) 64 of the locking member 20. The user then pushes the locking member 20 toward the frame member 4 so that the biasing member 22 and the clip 18 are moved toward the frame member 4. The biasing member 22 is thereby compressed to hold the lateral clip shoulders 50 and 52 in tight clipping engagement with the edges of the elements 3 and 5.

Once the locking member 20 has been moved inwardly to the desired compressing and clipping position, the locking member 20 is rotated to a locking position wherein the locking notch(es) 68 of the locking member 20 are in alignment with the attachment post locking tab(s) 30 and/or 32. The locking member 20 is then released so that the biasing member 22 will automatically place and hold the locking member 20 in locking engagement with the locking tab(s) 30 and/or 32.

Similarly, in order to release the elements 3 and 5 for removal, the locking member 20 is pushed slightly inward and rotated to its installation and removal position so that the locking member 20, the biasing member 22 and the clip 18 can be moved outwardly on the attachment post 14.

When rotated to its locking position as shown in FIG. 1, the locking member 20 will preferably extend over and substantially parallel to the outer edge 42 of the projecting frame ridge 8. This orientation will provide sufficient clearance for the installation of pre-filters, pre-coalescers, or other elements on the frame 6 over the upstream sides of the elements 3 and 5.

Although generally any type of retainer 24 can be used on the outer end of the attachment post 14, the retainer 24 will preferably be a crimp ring of the type shown in FIGS. 1-3 or a similar structure. A crimp ring 24 of the type shown in FIGS. 1-3 provides a secure attachment to the attachment post 14 but can be readily installed and removed using a pair of pliers or other common tool.

Another embodiment 100 of the inventive clipping apparatus is shown in FIGS. 4-10. The inventive clipping apparatus 100 is operable for both (a) clipping final filters or other elements 3 and 5 to the lateral shoulders 10 and 12 of the frame member 4 and (b) holding pre-filters, pre-coalescers, or other elements 102 and 104 on the frame 6 over the elements 3 and 5. The inventive clipping apparatus 100 preferably includes: an attachment post base 14; a clip 18 for clipping a pair of final filter elements 3 and 5 to the frame member shoulders 10 and 12; a locking member 20; a biasing member 22; and a retainer 24, all of which are substantially identical to the correspondingly numbered elements of in the inventive clipping apparatus 2. However, embodiment 100 of the inventive clipping apparatus differs from embodiment 2 in that the attachment post 106 of the inventive apparatus 100 is preferably longer and the inventive clipping apparatus 100 further comprises: a handle clip 108 which is longitudinally and rotatably movable on the attachment post 106; a coil spring or other biasing member 110 provided on the attachment post 106 between the handle clip 108 and the outer retainer 24; and a washer or similar device 105 provided on the attachment post 106 adjacent to the retainer 24 for assisting in holding the outer biasing member 110 on the attachment post 106.

The handle clip 108 is preferably a D-shaped structure which comprises: lateral base shoulders 114 and 116 which will engage and hold the edges of the pre-filter elements 102 and 104; an outer handle portion 118 which can be conveniently gripped, pulled, and rotated by the user for installing and removing the elements 102 and 104; a projecting spacer portion 120 provided between the lateral base shoulders 114 and 116 which will be inserted between the edges of the elements 102 and 104 for properly spacing and centering the elements 102 and 104; and an aperture 122 provided through the central spacer portion 120 of the base which will allow rotational and longitudinal movement of the handle clip 108 on the outer portion of the attachment post 106 but preferably will not allow the outer handle clip 108 to move inwardly over the attachment post locking tab(s) 30 and/or 32.

Figure 9:
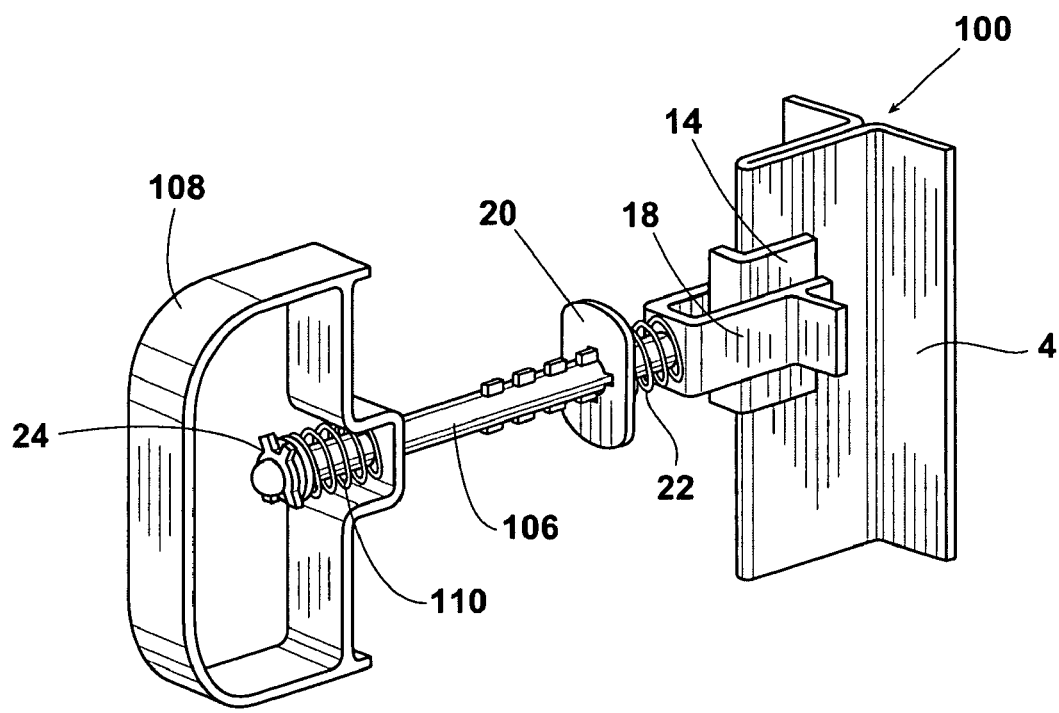
FIG. 9 is a side perspective view of the inventive clipping apparatus 100 wherein the handle clip 108 has been pulled outward.
Figure 7:
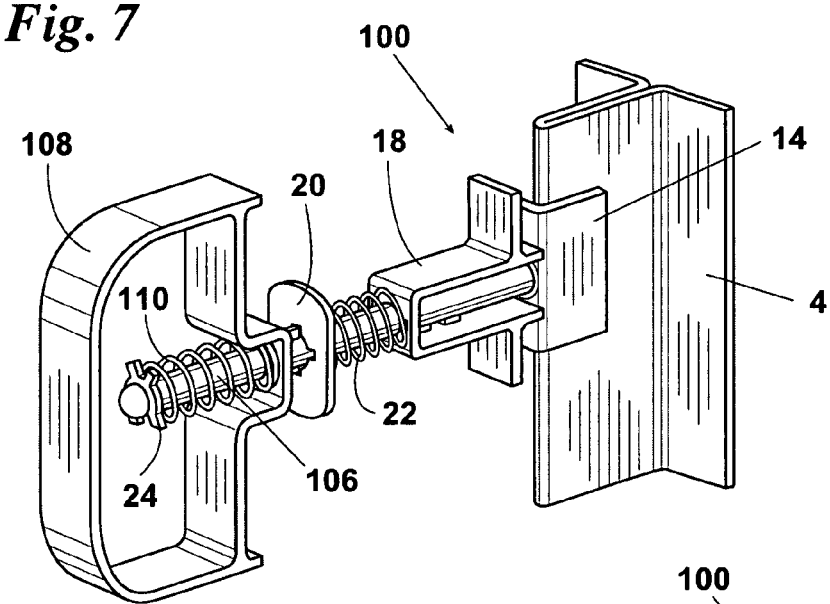
FIG. 7 is a side perspective view of the inventive clipping apparatus 100 wherein a final filter clip 18 thereof and the outer handle clip 18 are both rotated to an element installation and removal position.
Figure 8:
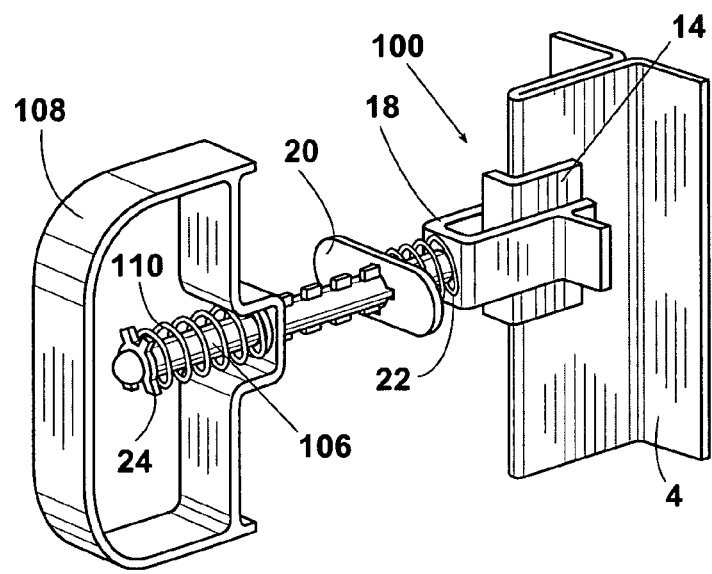
FIG. 8 is a side perspective view of the inventive clipping apparatus 100 wherein the filter clip 18 has been rotated to an element clipping position.

FIG. 7 shows the inventive clipping apparatus 100 wherein the clip 18, the locking member 20, and the handle clip 108 have all been rotated to their installation and removal positions parallel to the frame member 4 to allow the final filter elements 3 and 5 to be installed or removed. FIG. 8 shows the clip 18 as it has been rotated to its clipping position and is being pushed inwardly over the frame member 4 by the locking member 20. FIG. 9 shows the locking member 20 rotated to its locked position.

Figure 4:
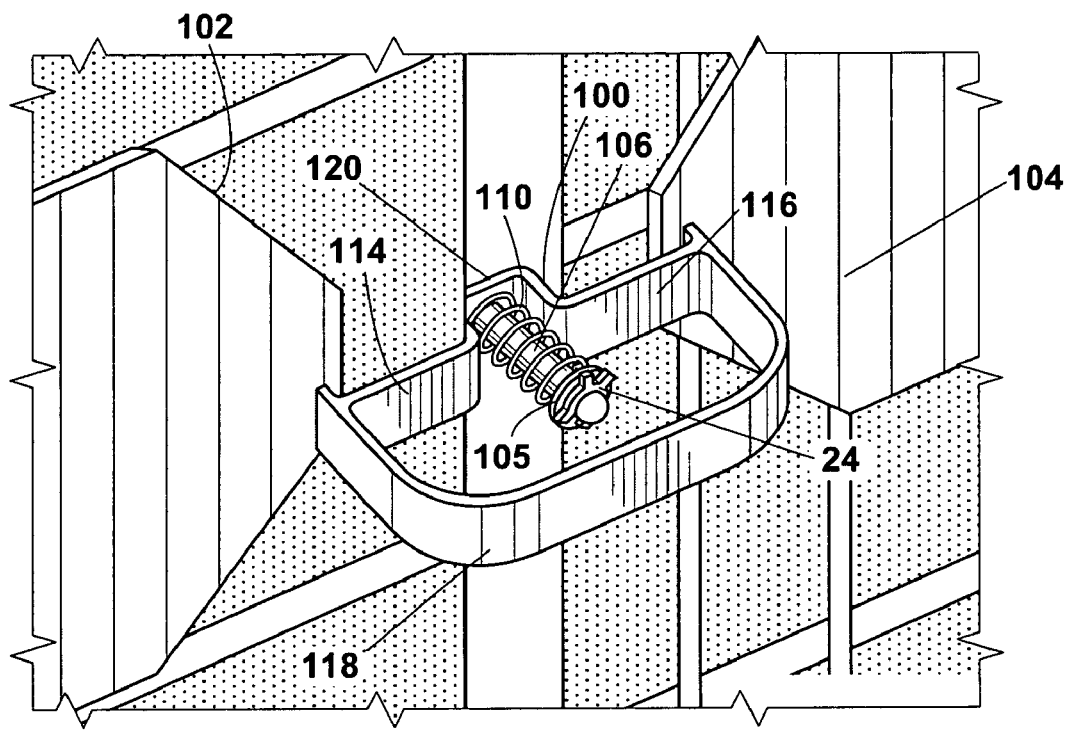
FIG. 4 is an outer end perspective view of an embodiment 100 of the inventive clipping apparatus wherein an outer handle clip 108 thereof has been rotated to an element clipping position.
Figure 5:
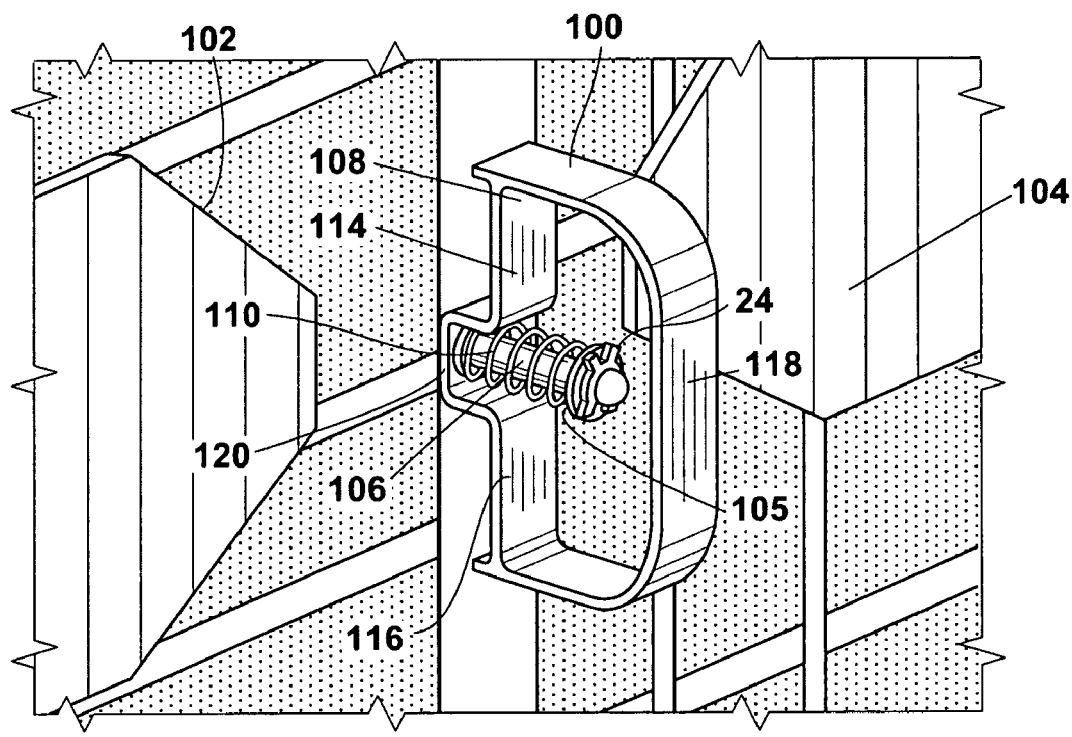
FIG. 5 is an outer end perspective view of the inventive clipping apparatus 100 wherein the outer handle clip 108 has been rotated to an element installation and removal position.
Figure 6:
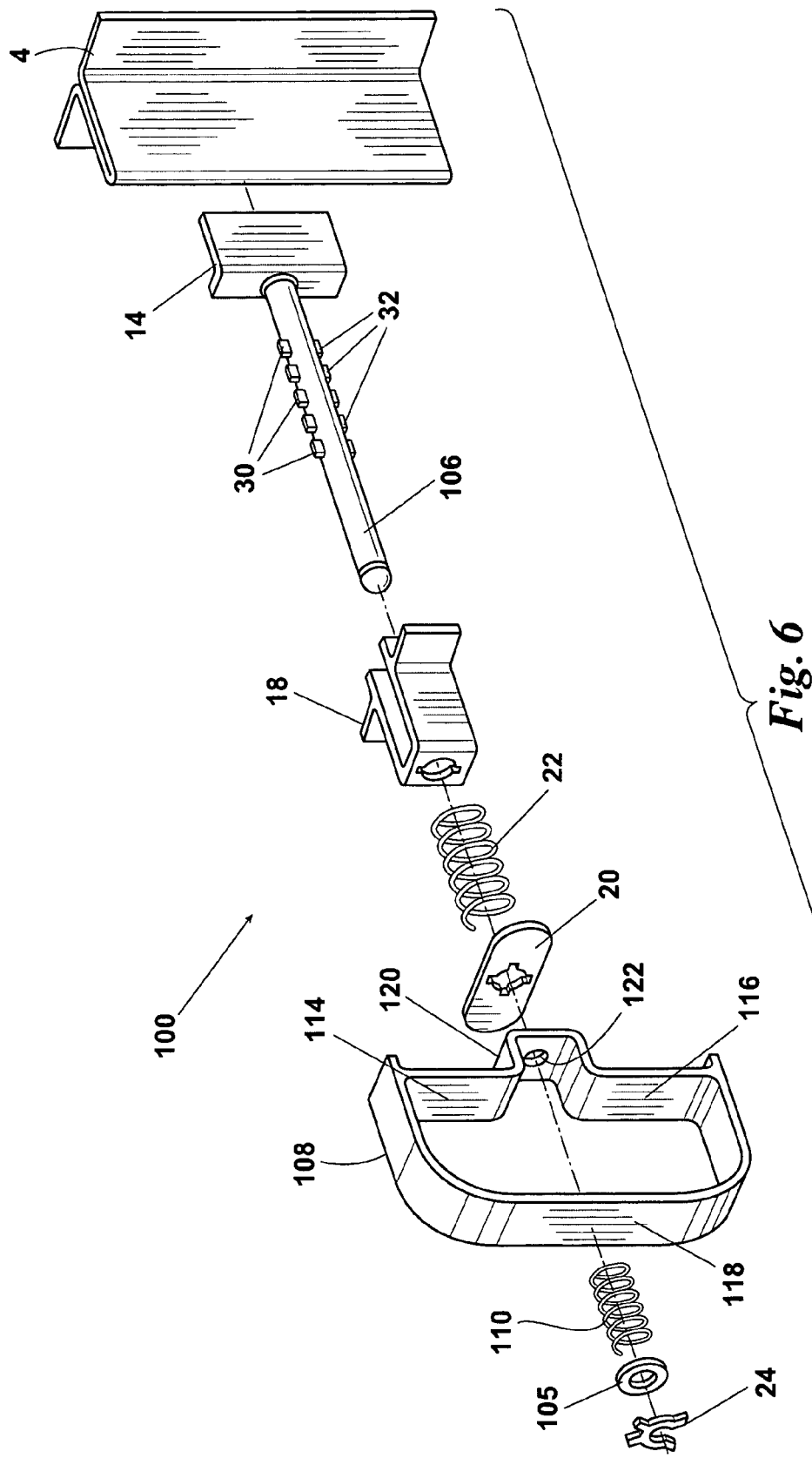
FIG. 6 is an exploded perspective view of the inventive clipping apparatus 100.
Figure 10:
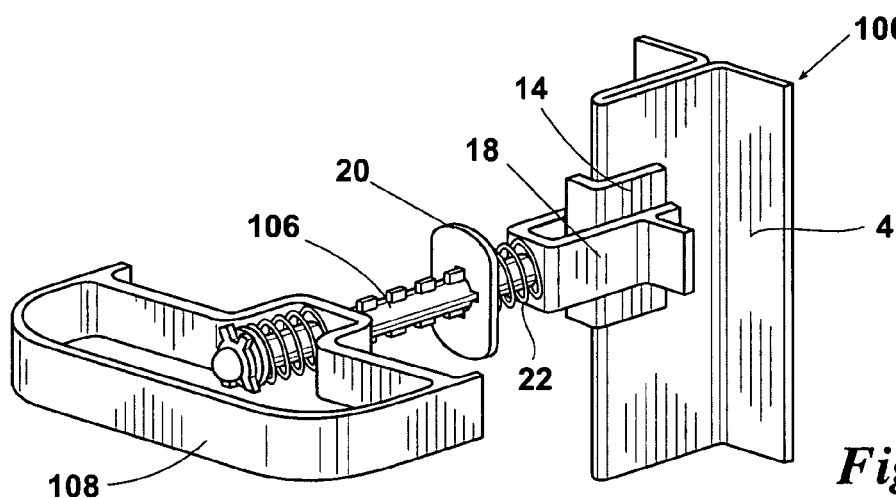
FIG. 10 is a side perspective view of the inventive clipping apparatus 100 wherein the handle clip has been rotated and released to an element clipping position.

In order to then clip the pre-filter elements 102 and 104 on the frame 6, the user can simply (a) pull the handle clip 108 outwardly by hand as shown in FIG. 9, (b) rotate the clip handle 108 to a clipping position as shown in FIGS. 4 and 10 which will preferably be about 90° from the installation/removal position, and then (c) release the handle clip 108 so that the biasing member 110 will automatically urge the base shoulders 114 and 116 of the handle clip 108 into engagement with the elements 102 and 104. At the same time, the spacer portion 120 of the handle clip base will move between and will automatically space and center the elements 102 and 104. Subsequently, the pre-filter elements 102 and 108 can be conveniently removed by simply reversing this procedure.

Although the particular embodiments 2 and 100 of the inventive apparatus described above are operable for clipping filter elements 3, 5, and/or 102, 104 on two lateral sides of the frame member 4, it will be understood by those in the art that each of the inventive apparatuses can be readily adapted for clipping one or more elements on just one side of the frame member 4.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within the spirit of this invention as defined by the appended claims.

What is claimed is:

1. An apparatus for releasably clipping to a frame at least one element for removing particulates, impurities, moisture, or a combination thereof from an air stream, said apparatus comprising:
   an attachment post which will extend outwardly from said frame, said attachment post having at least one locking tab thereon;
   a clip positionable on said attachment post for clipping said element to said frame;
   a locking member positionable on said attachment post; and
   a biasing member positionable on said attachment post between said locking member and said clip,
   wherein said locking member can be moved longitudinally on said attachment post and will interact with said locking tab in a manner effective for compressing said biasing member and locking said biasing member in a compressed position for holding said clip in engagement with said element and
   wherein said locking member can be rotated on said attachment post between a locking position wherein said locking member will engage said locking tab and a compressing and releasing position wherein said locking member will pass over said locking tab.

2. The apparatus of claim 1 wherein said locking member can be operated by hand.

3. The apparatus of claim 1 wherein said clip is longitudinally movable on said attachment post over said locking tab.

4. The apparatus of claim 1 further comprising a retainer securable on said attachment post for preventing said clip, said biasing member, and said locking member from falling off of said attachment post.

5. The apparatus of claim 1 further comprising a base on a proximal end of said attachment post, said base being positionable on a frame member included in said frame and said base being configured in a manner effective for automatically aligning said attachment post in position for clipping said element to said frame member when said base is placed on said frame member.

6. The apparatus of claim 5 wherein said attachment post has a longitudinal axis and said base has two lateral ends which are spaced laterally from said longitudinal axis.

7. An apparatus for releasably clipping to a frame at least one element for removing particulates, impurities, moisture, or a combination thereof from an air stream, said apparatus comprising:
   an attachment post which will extend outwardly from said frame, said attachment post having at least one locking tab thereon;
   a clip positionable on said attachment post for clipping said element to said frame;
   a locking member positionable on said attachment post; and
   a biasing member positionable on said attachment post between said locking member and said clip,
   wherein said locking member can be moved longitudinally on said attachment post and will interact with said locking tab in a manner effective for compressing said biasing member and locking said biasing member in a compressed position for holding said clip in engagement with said element and
   wherein when said locking member is unlocked, said clip can be moved outwardly on said attachment post away from said frame and rotated on said attachment post to an installation and removal position for installing and removing said element.

8. An apparatus for releasably clipping to a frame at least one element for removing particulates, impurities, moisture, or a combination thereof from an air stream, said apparatus comprising:
   an attachment post which will extend outwardly from said frame, said attachment post having a plurality of locking tabs provided thereon for installing elements of different thicknesses;
   a clip positionable on said attachment post for clipping an element to said frame;
   a locking member positionable on said attachment post; and
   a biasing member positionable on said attachment post between said locking member and said clip,
   wherein said locking member can be moved longitudinally on said attachment post and will interact with said locking tab in a manner effective for compressing said biasing member and locking said biasing member in a compressed position for holding said clip in engagement with said element.

9. An apparatus for releasably clipping to a frame at least two elements for removing particulates, impurities, moisture, or a combination thereof from an air stream, said apparatus comprising:
   an attachment post which will extend outwardly from said frame, said attachment post having at least one locking tab therein;
   a clip positionable on said attachment post for clipping a first of said elements to said frame on a first lateral side of an outwardly projecting ridge of a frame member included in said frame and said clip also being effective for clipping a second of said elements to said frame on a second lateral side of said outwardly projecting ridge;
   a locking member positionable on said attachment post; and
   a biasing member positionable on said attachment post between said locking member and said clip,
   wherein said locking member can be moved longitudinally on said attachment post and will interact with said locking tab in a manner effective for compressing said biasing member in a compressed position for holding said clip in engagement with said first and said second of said elements and
   wherein said clip includes element spacers positionable on each side of said outwardly projecting ridge for spacing said first and said second of said elements from said outwardly projecting ridge.

10. An apparatus for releasably clipping to a frame at least two elements for removing particulates, impurities, moisture, or a combination thereof from an air stream, said apparatus comprising:
    an attachment post which will extend outwardly from said frame, said attachment post having at least one locking tab thereon;
    a first clip structure positionable on said attachment post for clipping a first of said elements to said frame;
    a locking member positionable on said attachment post;
    a first biasing member positionable on said attachment post between said locking member and said first clip structure;
    a second clip structure positionable on said attachment post for longitudinal and rotational movement;
    a retainer securable on an outer end of said attachment post; and
    a second biasing member positionable on said attachment post between said second clip structure and said retainer,
    wherein said locking member can be moved longitudinally on said attachment post and will interact with said locking tab in a manner effective for compressing said first biasing member and locking said first biasing member in a compressed position for holding said first clip structure in engagement with said first of said elements,
    said second clip structure can be pulled outwardly and rotated to a first position for installing a second of said elements over said first of said elements, and
    said second clip structure can be rotated to a second position and released such that said second biasing member will urge said second clip structure against said second of said elements for holding said second of said elements over said first of said elements.

11. The apparatus of claim 10 wherein said second clip structure includes a gripping handle.

* * * * *